April 22, 1941.  E. G. ROEHM ET AL  2,239,625
PROFILE MILLING MACHINE
Filed Feb. 13, 1939  6 Sheets-Sheet 1

INVENTOR.
ERWIN G. ROEHM
HANS FRITSCHI
BY
A. H. Parsons
ATTORNEY.

April 22, 1941.　　E. G. ROEHM ET AL　　2,239,625
PROFILE MILLING MACHINE
Filed Feb. 13, 1939　　6 Sheets-Sheet 2

INVENTOR.
ERWIN G. ROEHM
HANS FRITSCHI
BY A. H. Parsons
ATTORNEY.

April 22, 1941.   E. G. ROEHM ET AL   2,239,625
PROFILE MILLING MACHINE
Filed Feb. 13, 1939   6 Sheets-Sheet 4

Fig. 6

INVENTOR.
ERWIN G. ROEHM
HANS FRITSCHI
BY
ATTORNEY.

Patented Apr. 22, 1941

2,239,625

UNITED STATES PATENT OFFICE 2,239,625

PROFILE MILLING MACHINE

Erwin G. Roehm, Norwood, and Hans Fritschi, Silverton, Ohio, assignors to The Cincinnati Milling Machine Co., Cincinnati, Ohio, a corporation of Ohio Application February 13, 1939, Serial No. 256,080

16 Claims. (Cl. 90—13.5)

This invention relates to machine tools and more particularly to improvements in milling machines.

One of the objects of this invention is to provide an improved dual purpose milling machine which may be selectively operated for milling either plane surfaces or irregular profile surfaces.

Another object of this invention is to provide an improved manually guided tracer controlled milling machine.

A further object of this invention is to provide improved means for tracer controlling the movements of a cutting tool.

An additional object of this invention is to provide a dual purpose machine of the character described with improved control means for each purpose, together with interlocks and safety features whereby controls not necessary to the selected method of operation can not be inadvertently actuated, thus rendering the machine safe in the hands of a comparatively inexperienced operator.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts.

Figure 1:
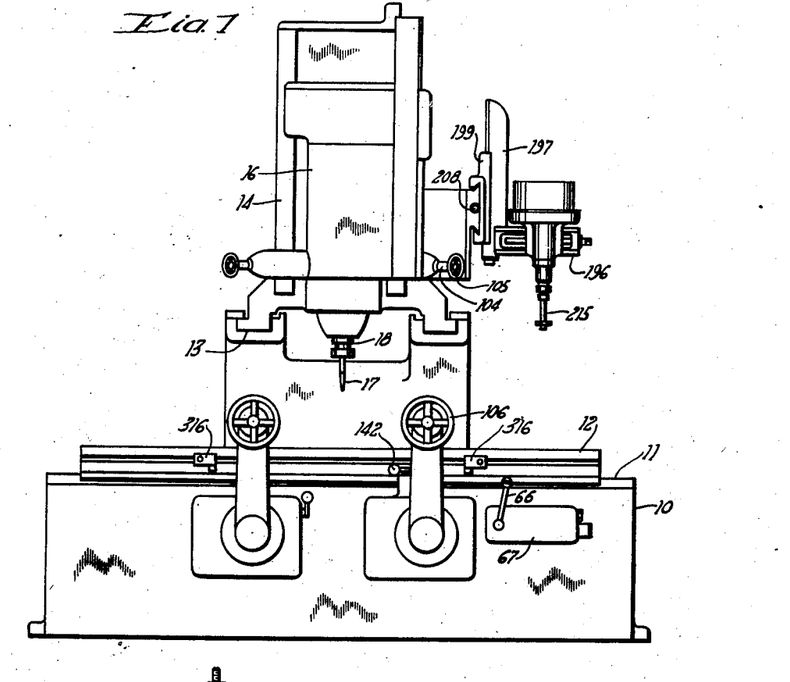
Figure 1 is a front elevation of a machine embodying the principles of this invention.
Figure 2:
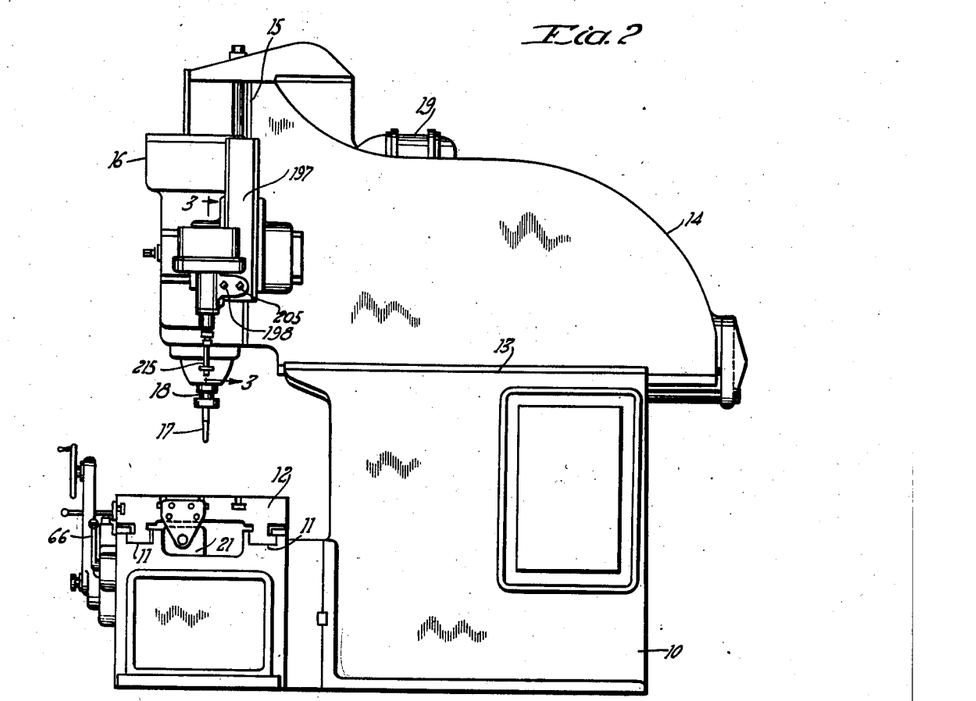
Figure 2 is a side elevation of the machine shown in Figure 1.

The general construction of the machine is shown in Figures 1 and 2 of the drawings in which the reference numeral 10 indicates, in general, the bed of the machine upon which is formed a first pair of guideways 11 for receiving the table 12, and a second pair of guideways 13 for receiving the cross slide 14, it being noted that the cross slide moves in a direction normal to the axis of movement of the table.

The cross slide 14 has a pair of guideways 15 upon which is mounted a vertically slidable tool head 16 so that the axis of the milling tool, such as 17, is perpendicular to the plane of movement of the cross slide and table. The tool 17 is supported in the end of a rotatable spindle 18 which is adapted to be driven by a prime mover, such as the electric motor 19, shown in Figure 2, through a suitable known transmission. This transmission may be of any known type, and since it does not constitute any part of this invention, the details thereof are not illustrated.

This machine is a dual purpose machine, the first of which is to mill plane surfaces, and the second of which is to mill irregular surfaces, known in the art as profiled surfaces.

Plane surfaces may be produced in various ways, such as traversing the table while the cross slide remains stationary; locking the table and moving the cross slide; or simultaneously moving both slides whereby the path of cutting will be at an angle to the direction of movement of both slides. The vertical slide is utilized more particularly for setting or determining the depth of cut, although with suitable tools, countersinking and boring operations may be performed.

Suitable controls, to be described hereafter, are provided for controlling the movements of the table and cross slide during plane milling. When the machine is utilized as a profiling machine a different set of controls is provided whereby a single element, such as the tracer, may simultaneously control either direction of movement of the two slides. Improved interlocking features are provided between the different sets of controls for guarding the operation of the machine.

Regardless of the method of control, or the purpose for which the machine is to be utilized, each slide actually moves in all cases by hydraulic motors, which are illustrated as being of the piston and cylinder type.

Figure 9:
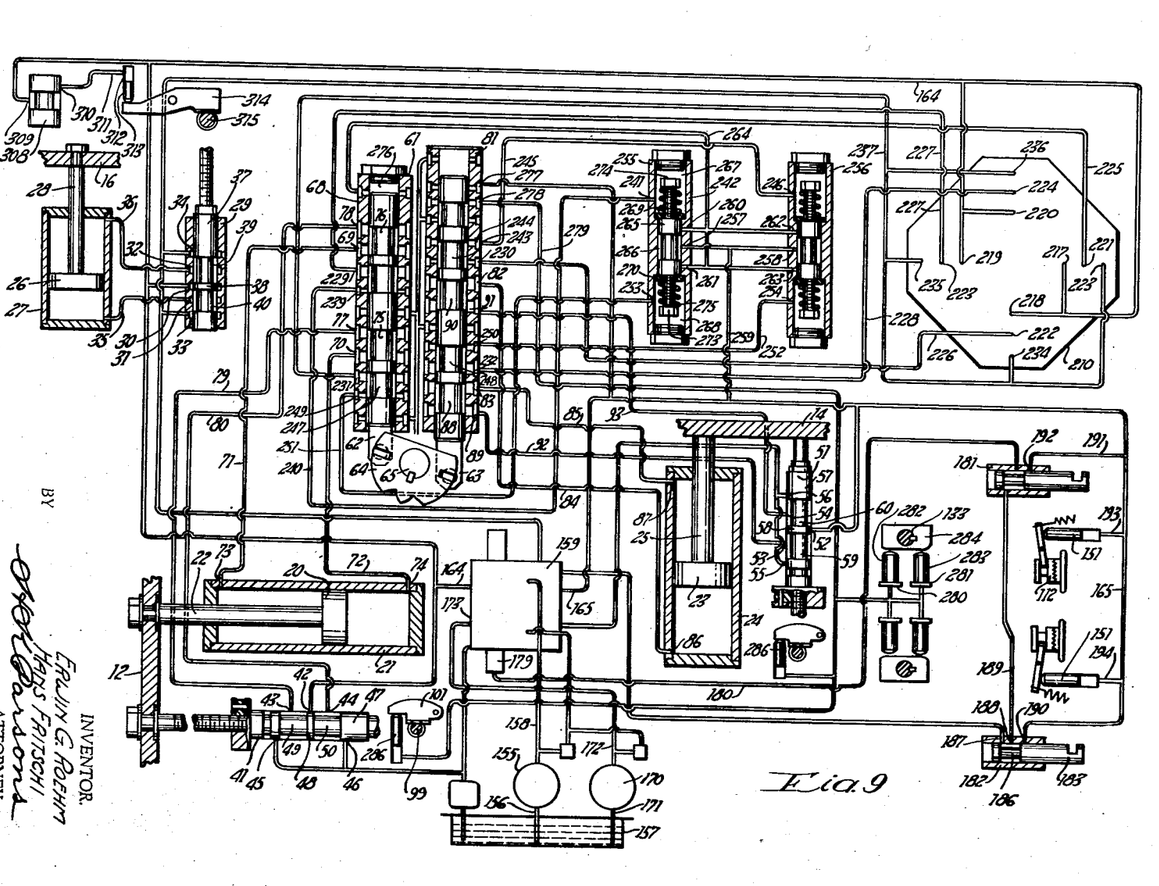
Figure 9 is a diagrammatic view of the hydraulic control circuit.

Referring to Figure 9, the table 12 is actuated by the piston 20 contained in the cylinder 21 and connected to the table by a piston rod 22. The cross slide 14 is actuated by a piston 23 contained in a cylinder 24 and connected to the cross slide by the piston rod 25. The vertical slide 16 is actuated by a piston 26 contained in a cylinder 27, the cylinder being integral with the slide and the piston 26 being connected by the piston rod 28 to the cross slide 14. The admission of pressure to the cylinder 27 is controlled solely by a servo-control valve indicated generally by the reference numeral 29, which has a central pressure port 30, a pair of motor ports 31 and 32, and a pair of exhaust ports 33 and 34. The motor ports 31 and 32 are connected by channels 35 and 36 to opposite ends of the cylinder 27. The valve has a plunger 37 upon which is formed a central spool 38 normally in a position to close the pressure port 30, and a pair of annular grooves 39 and 40 formed on opposite sides of the central spool for alternately connecting the pressure port to one of the motor ports, and simultaneously connecting the other motor port to an exhaust port for effecting movement of the slide.

A servo-control valve 41 is provided for controlling admission of fluid pressure to the table cylinder 21 during plane milling operations, and for set-up purposes. This valve has a pressure port 42, a pair of motor ports 43 and 44 and a pair of exhaust ports 45 and 46. The valve plunger 47 has a central spool 48 for normally closing the pressure port, and a pair of annular grooves 49 and 50 on opposite sides of the spool for selectively connecting the pressure port to one of the motor ports, and simultaneously the other motor port to exhaust for causing actuation of the table.

The admission of fluid pressure to the cross slide cylinder 24 during plane milling operations and for set-up purposes is controlled by a servo-valve 51 which has a pressure port 52, a pair of motor ports 53 and 54 and a pair of exhaust ports 55 and 56. The valve plunger 57 has a central spool 58 for normally closing the pressure port, and a pair of annular grooves 59 and 60 on opposite sides of the spool for selectively connecting the pressure port to one of the motor ports and simultaneously the other motor port to exhaust.

The cylinders 21 and 24 are connected to their respective servo-control valves through a selector valve mechanism, indicated generally by the reference numeral 61. This mechanism comprises two valve plungers 62 and 63 which are mechanically interconnected by a centrally pivoted lever 64, whereby upon rotation of the lever the valve plungers will be shifted in opposite directions.

The lever 64 is keyed to a shaft 65 which has an operating handle 66 fixed to the end thereof for manual actuation, the lever being shown in Figures 1 and 2 of the drawings. The selector valve mechanism is mounted in a housing 67 attached to the front of the machine.

The object of the selector valve mechanism is to condition the hydraulic circuit for either one of the two methods of operating the machine. In other words, in one position of the selector valve mechanism the two servo-control valves 41 and 51 are hydraulically connected to their respective cylinders 21 and 24.

In the other position of the selector valve mechanism, the servo-valves are hydraulically disconnected from the respective cylinders 21 and 24, and these cylinders are connected hydraulically to a tracer controlled valve. These various connections are established by the following means.

The valve plunger 62 is slidably mounted in a sleeve 68 which has a pair of ports 69 and 70 to which are connected channels 71 and 72 leading to ports 73 and 74 located in opposite ends of the cylinder 21. With the plunger 62 in the position shown in Figure 9, the ports 69 and 70 are connected by the annular grooves 75 and 76 to ports 77 and 78. These latter ports are connected by channels 79 and 80 to the motor ports 43 and 44 of the servo-valve 41. The plunger 63 is slidably mounted in a sleeve 81 which has a pair of ports 82 and 83 connected by channels 84 and 85 to ports 86 and 87 located in opposite ends of the cross slide cylinder 24. With the plunger 63 in the position shown, the port 83 is connected by the annular groove 88 to port 87 and the port 82 is connected by the annular groove 90 to port 91. The ports 89 and 91 are connected by channels 92 and 93 to motor ports 54 and 53 respectively of the servo-control valve 51. It will now be apparent that shifting of either servo-valve will cause movement of the respective slide.

The servo-valves 41 and 51 are adapted to be shifted manually, or by power at a plurality of feed rates or at a rapid traverse rate. Since duplicate control mechanisms are provided for each valve, only one mechanism will be described, it being understood that a duplicate mechanism is provided for controlling the other servo-valve.

Furthermore, the construction of all three servo-valves is the same, and therefore, only one of these will be described, reference being had to Figure 6. Assuming the construction shown in Figure 6 as applied to the table, the servo-valve will therefore be indicated by the reference numeral 41 and the plunger by the reference numeral 47. The plunger 47 has clutch teeth 94 on one end which intermesh with clutch teeth 95 formed on the end of a driving sleeve 96. The sleeve 96 is rotatably mounted in anti-friction bearings 97, which also hold it against axial movement with respect to the fixed housing 98. The object of the clutch teeth is to permit axial movement of the plunger 47 relative to the axially fixed sleeve 96. A lead screw 99 passes through the plunger 47 and the sleeve 96 and is attached at opposite ends to the movable slide, which, in this case, is the table 12. The screw acts as a feed back connection from the movable slide to the servo-valve.

Figures 3, 8:
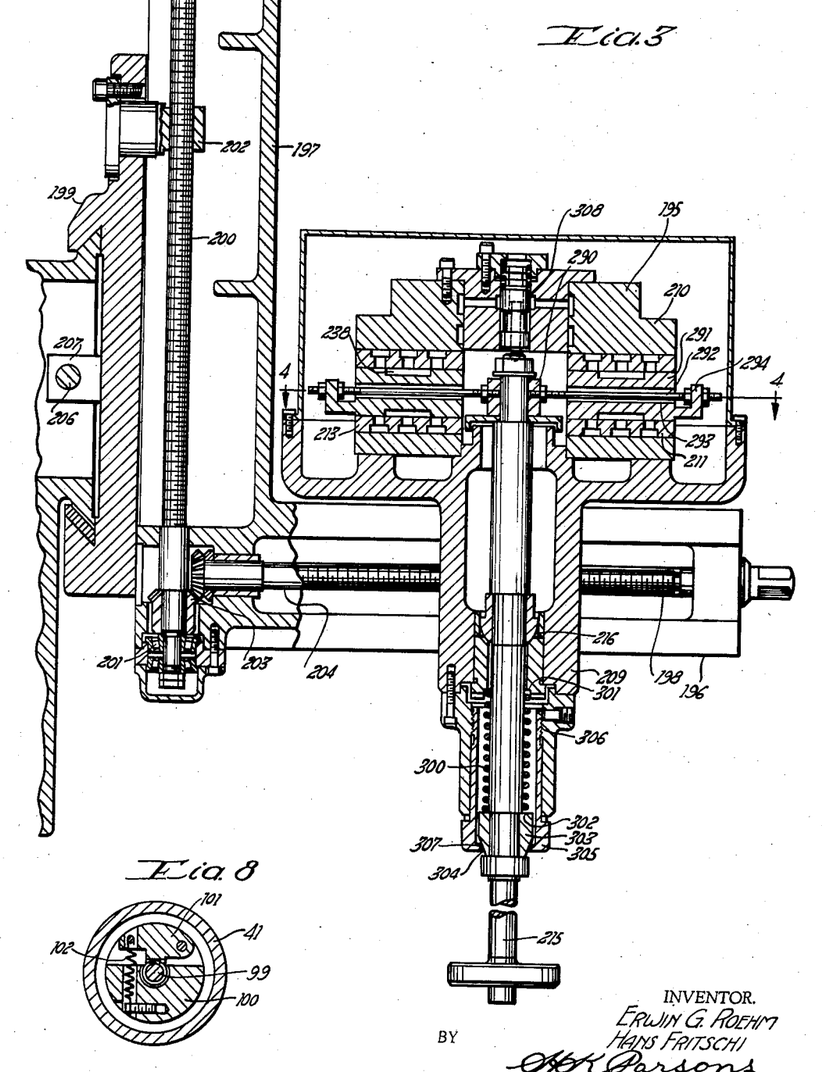
Figure 3 is an enlarged section through the tracer head as viewed on the line 3—3 of Figure 2.
Figure 8 is a detail section on the line 8—8 of Figure 6.

The valve plunger 47 has an enlarged head 100 formed on one end thereof in which is pivotally mounted, as shown in Figure 8, the half nut 101. A spring 102 normally holds the half nut into engagement with the lead screw 99. An actuating gear 103 is formed integral with the sleeve 96 and it will now be apparent that upon rotation of this gear, and with the half nut in engagement with the lead screw 99, that the plunger 47 will be shifted axially relative to the sleeve 96 and thus establish a pressure connection of port 42 with the table cylinder 21, and an exhaust connection from the other end of the cylinder whereby the piston 20 and connected slide will proceed to move. This movement will be fed back to the lead screw 99, which will impart axial movement to the plunger 47 in a direction opposite to that in which it was first moved, thus recentralizing the central spool 48 with respect to the port 42.

In the case of the vertical slide, the gear 103 will be a bevel gear so as to intermesh with a bevel gear not shown but attached to the end of the shaft 104 shown in Figure 1 and provided with a hand wheel 105. It will thus be obvious hat upon rotation of the hand wheel 105, the vertical slide 16 may be adjusted relative to the table.

The means for operating the gear 103 as respects the table and cross slide consists of the manually rotatable handwheel 106, and a prime mover 107. The hand wheel 106 is mounted on the front of the machine as shown in Figure 1 and is connected through a sprocket chain 108, Figure 6, and sprocket wheels 109 and 110 to a shaft 111. The sprocket wheel 110 is supported for free rotation on the shaft 111 and it is necessary to connect the sprocket wheel to the shaft by means of the shiftable clutch member 112 in order to impart rotation thereto. The shaft 111 has a gear 113 keyed to the end thereof in mesh with the gear 103 for transmitting motion thereto.

For power actuation prime mover 107 is connected by a sprocket chain 114 and sprocket wheels 115 and 116 to a shaft 117. This shaft is continuously rotated during actuation of the prime mover and drives through gearing 118 a friction disc 119 which, in turn, rotates a friction disc 120.

The latter is splined on a shaft 121 and is shiftable relative thereto for moving the disc 120 toward and from the center of rotation of the disc 119 to thereby vary the rate of rotation of the shaft 121. This constitutes a variable feed mechanism of the friction disc type. The shaft 121 drives a spiral gear 122 supported for free rotation on the shaft 123. The latter shaft has a spline portion 124 upon which slides a rate determining clutch member 125 having an internal cone shaped face 126 for engagement with the cone 127 keyed to the end of the shaft 117 for actuation of shaft 123 at a rapid traverse rate; and clutch teeth 128 on the other end for interengagement with similar shaped clutch teeth formed on the end of the gear 122 for actuation of the shaft 123 at variable feed rates.

The shaft 123 terminates in a bevel gear 129 which drives a pair of bevel gears 130 and 131 supported for free rotation on shaft 111 in opposite directions. An intermediate clutch member 132 splined on the shaft 111 serves to selectively connect the gears 130 and 131 for actuation of the shaft in opposite directions, thus constituting a direction determinator or reverser. Thus, the shaft 111 may be driven at one of several feed rates or at a rapid traverse rate, and in either direction, and since the clutch 132 has a neutral position, the entire power transmission may be disconnected from the shaft whereby the same may be rotated manually.

Figure 7:
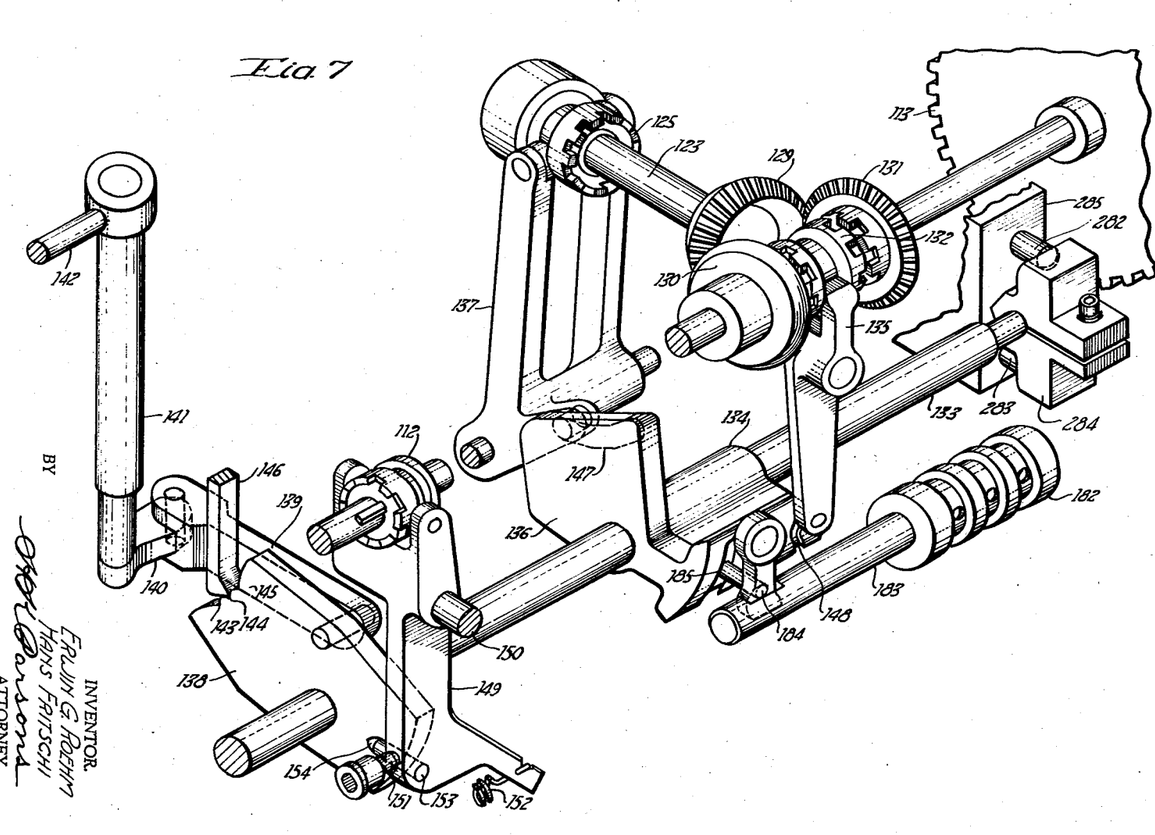
Figure 7 is a perspective view of the control mechanism for the power transmission.

The positioning of the rate and direction determining clutches 125 and 132 is controlled by a single shaft 133 which, as shown in Figure 7, carries a cam 134 for operating the shifter 135 for the direction determining clutch 132; and a second cam 136 which is connected to the shifter 137 for controlling the position of the rate clutch 125. The shaft 133 has a detent plate 138 keyed thereto and this plate is connected by a link 139 to a crank arm 140 keyed to a vertical shaft 141. The shaft 141 is mounted on the front of the machine as respects the table and is provided with a manual control lever 142. The plate 138 has three notches 143, 144 and 145 formed in its periphery for receiving a spring pressed detent 146. When the detent engages the central notch 144, the parts are in a neutral position, and when the detent engages either the groove 143 or 145, the parts are in a feed position, the direction being determined upon the direction of rotation of the plate 138 from its central position.

The parts may also be rotated in either direction beyond the feed position into a rapid traverse position but the parts must be held in the rapid traverse position by the operator and as soon as he releases the handle 142 the spring pressed detent 146 will move the plate back into the nearest feed position.

The cam groove 147 which controls the feed-rapid traverse clutch 125 has a central arcuate portion of the same radius which holds the clutch 125 in a feed position during rotation of the plate through the angle measured between the notches 143 and 145. The cam groove 148 is shaped to produce an immediate shifting of the clutch 132 upon rotation of the cam in either direction from a neutral position.

For instance, as the shaft 133 is rotated clockwise as viewed in Figure 7, the clutch 132 will be shifted into engagement with the gear 130, and upon counterclockwise rotation of shaft 133, the clutch 132 will be shifted into engagement with the gear 131. Further rotation of the shaft in either direction beyond these positions will produce no further movement of the clutch. But further rotation of the cam 136 will bring into effect the opposite ends of the cam groove 147 which have a greater radius than the central portion of the cam groove whereby the clutch 125 will be shifted into a rapid traverse position. It will now be evident that the shaft 133 is capable of being moved into any one of five different positions to produce five different results.

It is desirable, when the power transmission is being utilized, to have the hand wheel 106 disconnected from the drive shaft 111, and when the power transmission is not utilized, to have the hand wheel connected to the shaft. These different results are effected automatically by mechanism controlled from the shaft 133. The clutch member 112 is provided with a shifter fork 149 which is pivotally supported on the pin 150 and is continuously urged in a counterclockwise direction about this pivot by a hydraulic piston 151 to normally hold the clutch 112 engaged. A spring 152 is connected to the end of the shifter to effect an urge thereon in a clockwise direction whereby upon failure of the hydraulic pressure the clutch 112 will be disengaged, thereby preventing manual actuation of the servo-valve when no hydraulic pressure is present. In the neutral position of the detent plate 138, a pin 153 carried by the shifter 149 engages a groove 154 in the plate, which groove is of sufficient depth to permit the clutch 112 to be engaged.

Upon rotation of the plate 138 from its neutral position, the pin 153 is caused to ride out of the groove and cause disengagement of the clutch 112. Therefore, this clutch is only engaged when the detent plate 138 is in a neutral position.

Figure 5:
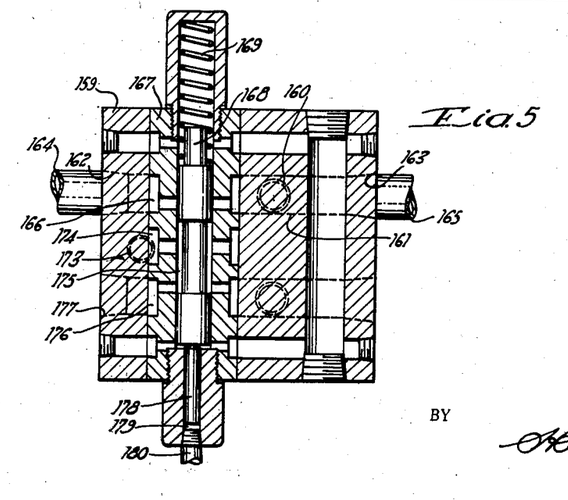
Figure 5 is a detailed section through the rapid traverse pump control valve.

The hydraulic system shown in Figure 9 is supplied with fluid pressure by a pump 155 which has an intake 156 through which fluid is withdrawn from a reservoir 157, and a delivery line 158 which is connected to a valve housing 159. The details of construction of this housing is shown in Figure 5. The reference numeral 160 indicates the port to which the delivery line 158 is connected and this port communicates with a cross bore 161 which terminates at opposite ends in ports 162 and 163 to which are connected channels 164 and 165 for distribution of the fluid to different parts of the system. The bore 160 intersects an annular groove 166 formed in a fixed sleeve 167. A plunger 168 is slidably mounted within the sleeve and is normally held in the position shown in Figure 5 by a spring 169.

The pump 155 may be designated as a feed pump for the reason that this pump supplies the fluid for operating the slides at feeding rates, but when the transmission is adjusted to shift the servo-valves at a rapid traverse rate, the volumetric delivery of the pump 155 may not be adequate to supply the demand, and therefore, a second pump 170, which may be termed a rapid traverse pump, is provided for supplying additional fluid to the system during rapid traverse movement of either support. This pump has an intake 171 through which fluid is withdrawn from the reservoir 157 and a delivery channel 172 which terminates in port 173 of the valve housing 159.

It will be noted from Figure 5 that the port 173 intersects a second annular groove 174 formed in the sleeve 167. An annular groove 175 formed in the plunger 168 normally interconnects the groove 174 with a groove 176 which communicates with the exhaust port 177. Thus, during normal operation of the machine, the rapid traverse pump is connected through the valve housing 159 to reservoir. When the control mechanism shown in Figure 7 is adjusted to effect a rapid traverse movement, the plunger 168 is shifted against the compression of spring 169 by a hydraulically actuated piston 178 until the annular groove 175 interconnects the port 173 with the annular groove 166 and thereby the cross bore 161. In this way the delivery of the rapid traverse pump is added to the delivery of the feed pump.

The piston 178 is slidably mounted in a cylinder 179 and the end of cylinder is connected by a channel 180 to a pair of serially arranged valves 181 and 182, Figure 9. One of these valves is mounted in the feed box for the saddle and the other is mounted in the feed box for the table. The valve 182 may be assumed to be the valve shown in Figure 7. The plunger 183 of this valve has a follower 184 engaging a second cam groove 185 in the cam 134 attached to the shaft 133. This cam groove is annular throughout the extent of movement of the shaft 133 in either direction to effect feed rates but diverges beyond either feed position to cause shifting of the plunger 183 for either rapid traverse position of the shaft 133. Returning to Figure 9, the plunger 183 has an annular groove 186 which normally interconnects an exhaust port 187 to port 188, the latter being connected by channel 189 and valve 181 to cylinder 179.

When the plunger 183 is shifted, however, a pressure port 190 is connected to the port 188 whereby fluid pressure is admitted to the cylinder 179 and the piston 178 shifts the valve plunged 168 into a position to add the delivery of the rapid traverse pump to that of the feed pump. The channel 165 has a branch line 191 leading to the pressure port 192 of valve 181, whereby this valve may also connect pressure to the cylinder 179 to cause connection of the rapid traverse pump to the system. The line 165 also has branch connections 194 and 193 which supply the pistons 151 that normally hold the manual control clutches 112 in an engaged position.

In order to perform profiling operations with this machine, a tracer mechanism indicated generally by the reference numeral 195 in Figure 3 is provided. This mechanism, although supported on the vertical slide for simultaneous movement with the cutter is provided with means for three directional adjustment with respect to the cutter for set-up purposes. In other words, the tracer mechanism 195 is supported on guideways 196 formed on an L-shaped bracket 197, an adjusting screw 198 rotatably mounted in the bracket serves as means for manually positioning the tracer mechanism toward and from the cutter. The bracket 197 is slidably mounted in guideways formed on the saddle 199. An adjusting screw 200 is rotatably journaled on anti-friction bearings 201 in the bracket 197 and has a threaded connection with a nut 202 carried by the saddle 199. The screw 200 is connected by bevel gearing indicated generally by the reference numeral 203 to an operating shaft 204 which extends longitudinally of the bracket and is provided with a squared end 205 for application of a suitable wrench.

The saddle 199 is capable of cross adjustment by means of a screw 206 which has a threaded connection with a nut 207 integral with the cross slide. The screw 206 is supported on vertical slide 16 and is provided with a squared end 208 as shown in Figure 1 for application of a suitable wrench.

By means of these three adjustments the tracer mechanism may be adjusted in any direction with respect to the cutter spindle to facilitate set-up or for removing the tracer mechanism to an inoperative position for straight milling operations.

Figure 4:
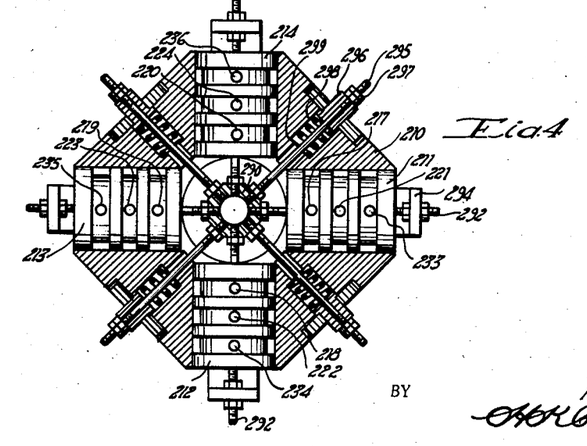
Figure 4 is a section through the tracer control valve as viewed on the line 4—4 of Figure 3.

The tracer mechanism comprises a tracer head 209 upon the top of which is mounted a valve block 210. As shown in cross section in Figure 4 the valve block contains four valve sleeves 211, 212, 213 and 214 which are spaced 90 degrees apart. The valve block is so positioned that the sleeves 211 and 213 are parallel to the direction of movement of the table, and the sleeves 212 and 214 are parallel to the direction of movement of the cross slide. This makes the tracer 215 which is pivotally supported at 216 in the tracer head and connected to the valve plungers slidably mounted in these sleeves, a directional control tracer because the resultant movement of the cutter with respect to the work depends upon the radial direction in which the tracer is deflected with respect to the vertical axis of the tracer head. It will be noted that each of the sleeves shown in Figure 4 is provided with three annular grooves, and radial holes in these grooves form ports. The inside ports 217, 218, 219 and 220 in the respective sleeves are pressure ports and as shown in Figure 9 are all connected to the feed pump delivery channel 164. The middle ports 221, 222, 223 and 224 are connected by separate channels 225, 226, 227 and 228 to ports 229, 230, 231 and 232 of the selector valve mechanism.

The outside ports 233, 234, 235 and 236 are connected to a common return channel 237. It will now be seen that each valve sleeve is provided with a pressure port, an intermediate motor port, and an exhaust port.

Each sleeve is provided with a valve plunger which, as shown in Figure 3, has an annular groove 238 of such width that when in a central position the pressure port and exhaust port are closed so that upon movement of the plunger, either the pressure port or the exhaust port will be connected to the motor port. Thus, each valve is capable of causing one direction of movement, that is, by connecting pressure to a motor port.

When the selector valve mechanism is in the position shown in Figure 9, the ports 229, 230, 231 and 232 are disconnected from the table and cross slide cylinders 21 and 24, but in order to prevent damage to the tracer in case same is inadvertently deflected during manual or power actuation of either slide, these various ports are connected to a pilot valve mechanism which will, when actuated, cause automatic shifting of the selector valve mechanism into a tracer controlled position.

Therefore, when the selector valve mechanism is in the position shown, each of the ports 229, 230, 231 and 232 are connected to the pilot valve mechanism so as to cause actuation thereof when fluid pressure is admitted to any of channels 225, 226, 227 or 228 by deflection of the tracer. In other words, the port 229 is connected through annular groove 238 to port 239 from which a channel 240 extends to port 241 of the pilot valve mechanism, indicated generally by the reference numeral 242.

The port 230 is connected by annular groove 243 to port 244 from which channel 245 extends to port 246 of the pilot valve mechanism. The ports 231 and 232 are connected by annular grooves 247 and 248 to ports 249 and 250 respectively from which extend channels 251 and 252 to ports 253 and 254 respectively of the pilot valve mechanism.

The pilot valve mechanism comprises two valve housings 255 and 256 having pressure ports 257 and 258 respectively, which are supplied with fluid through a branch 259 of the feed pump delivery channel 165. The valve housing 255 has a pair of ports 260 and 261, and the housing 256 has a pair of ports 262 and 263, and all four of these ports are connected to a common return line 264. The housing 255 has a valve plunger 265 which is reciprocably mounted in a bore 266. This bore terminates at opposite ends in larger bores 267 and 268.

The plunger 265 has a length equal to the length of the bore 266 so that spring pressed washers 269 and 270 mounted in the larger bores 267 and 268 can hold the plunger 265 in a central position with respect to its bore. Bolts 273 and 274 are threaded in opposite ends of the plunger, and springs 275 are interposed between the bolt heads and the washers to hold the latter against the shoulders formed by the smaller bore and simultaneously against the end of the plunger. The valve housing 256 is provided with a similar plunger mechanism.

It will now be evident that if pressure is admitted to port 253, for instance, and the port 241 connected to exhaust, which would happen upon deflection of the tracer in the plane of valve sleeves 211 and 213, the pressure acting in chamber 268 would shift the plunger 265 upward as viewed in Figure 9, and thereby connect the pressure port 257 to port 260.

The fluid would then flow through channel 264 to chamber 276 in the upper end of the valve housing containing plunger 62 forcing the same downward and, through link 64, forcing the plunger 63 upward. This would position the selector valve mechanism in a tracer control position, and disable the power and manual control mechanism.

When the selector valve mechanism is shifted to a tracer control position the port 231 is connected by annular groove 75 to port 70 whereby the port 223 of the tracer mechanism controls the admission of fluid to port 74 of the table cylinder 21; the port 229 is connected by groove 76 to port 69 whereby the port 221 of the tracer mechanism controls the admission of fluid to port 73 of table cylinder 21; the port 232 is connected by annular groove 88 to port 83 whereby the tracer port 224 controls admission of fluid to port 87 of the cross slide cylinder 24; and the port 230 is connected by groove 90 to port 91 whereby the tracer port 222 controls admission of fluid pressure to port 86 of the cross slide cylinder 24. It will now be seen that both cylinders 21 and 24 are disconnected from their respective servo-control valves and are connected to the tracer control valves.

The valve housing 81 has a pressure port 277 which is supplied with fluid from channel 165 and when the selector valve is shifted to a tracer control position this port is connected to port 278. A channel 279 extends from this port to a series of interlocking devices associated with the respective power transmissions, one device functioning to rotate the control shaft 133 to a neutral position and the other to effect disengagement of the half-nuts 101 from the servo-control lead screw 99.

The first device comprises a pair of cylinders 280 and 281 in which are mounted plungers 282 and 283. As shown in Figure 7 the shaft 133 has a double-ended lever 284 keyed thereto and positioned in front of a housing 285 and in which the cylinders 280 and 281 are formed so that the plungers 282 and 283 engage opposite ends of the lever.

When no pressure is in the cylinders the lever may be rotated freely but when pressure is admitted to the cylinders the pistons function to rotate the lever to a neutral position. A similar set of pistons and levers are provided for the other transmission as shown in Figure 9 and connected in parallel to channel 279.

The second device consists of a hydraulically actuated plunger 286 which is carried in the enlarged end 100 of the servo-valve sleeve 47 and when pressure is admitted thereto, it lifts the half nut 101 out of engagement with the screw.

Figure 6:
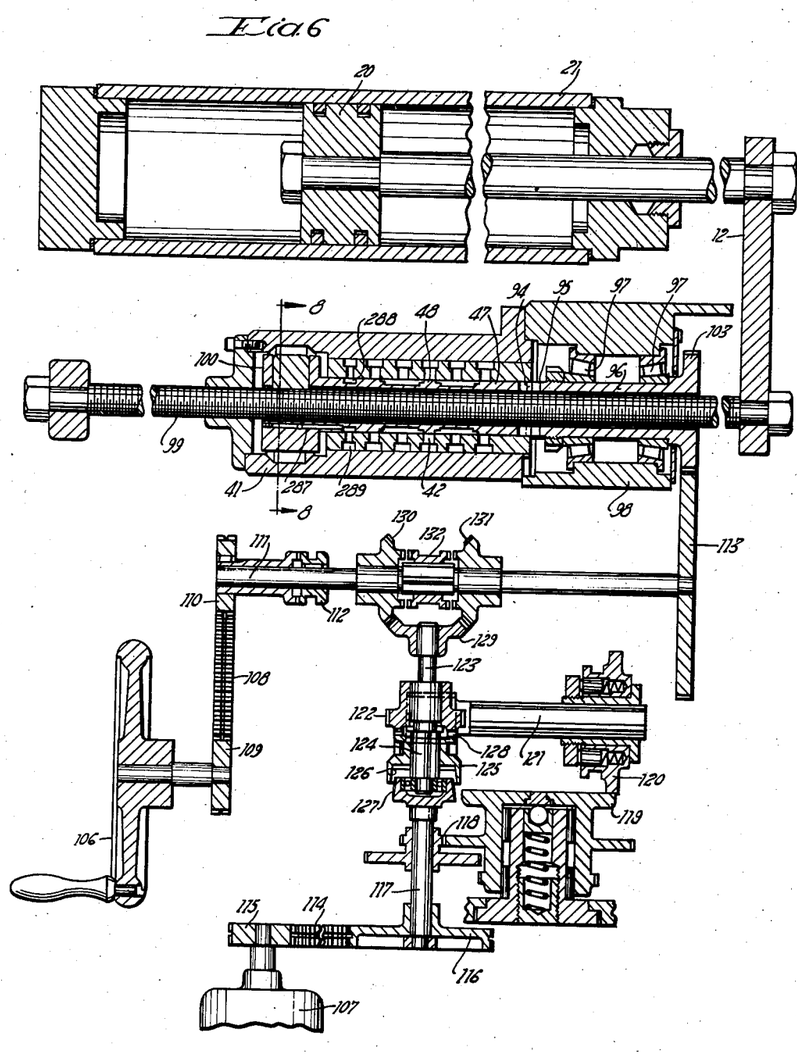
Figure 6 is an expanded view of the power transmission for the table.

As shown in Figure 6, the plunger 286 is connected by an interdrilled channel 287 to an annular groove 288 formed in the sleeve 47 which is in constant communication with a port 289 formed in the housing 41. It will now be apparent that the shifting of the selector valve mechanism places the tracer control mechanism in command of the operation of the table and cross slide, and neutralizes the power transmission as well as disabling same whereby rotation of the hand wheel 106 will produce no movement of the servo-valve when the same is rendered ineffective.

Referring to Figure 3, the tracer arm 215, which is pivotally supported in the tracer head, carries an octagonal block 290, and the tracer valve plungers 291 are connected to opposed pairs of faces of this block by rods 292. These rods are threaded into the block and pass through central bores 293 in the respective plungers and connected to integral angle brackets 294 formed on the end of the plungers farthest from the block. This construction permits a certain amount of flexibility in the rods when the tracer is deflected.

In order to insure that the tracer is held in a central position and is returned to that position when released by the operator, a second series of rods 295 are attached to the intervening faces of the block and extended to the outer end of the valve block 210 where they are provided with sleeves 296. The sleeves are held against outward movement by lock nuts 297. A spring 298 is mounted between the end of the sleeve and a shoulder 299 to thereby exert a continuous urge in an outward direction. These centralizing devices are arranged in opposing pairs and by adjustment of the various lock nuts 297, the tracer may be centralized.

The tracer arm 215 is normally held against lifting by a spring 300 interposed between a fixed shoulder 301 and a shoulder 302 which is attached to the arm. The shoulder 302 is formed on a sleeve 303 which has a conical shaped end 304. A feed rate adjusting sleeve 305 is threaded at 306 in the tracer head and provided with a bore 307 through which passes the cone 304. By vertical adjustment of the sleeve 305 the amount of lost motion between the cone and the bore 307 may be varied. This limits the amount that the operator can deflect the tracer and thereby determines the maximum feed rate that can be effected by the tracer valve.

A hydraulic interlock has been provided which acts as a safety precaution against the operator moving the head 16 downward and thereby moving the tracer into engagement with some obstruction which would cause damage thereto. In other words, if the head is moved downward and the end of the tracer engages an obstruction the tracer is moved axially upward and thereby shifts a valve plunger 308 mounted in the valve block 210, connecting pressure port 309 to port 310 which has a channel 311 connected thereto and leading to a cylinder 312. This cylinder contains a plunger 313 which will rock the half nut 314 out of engagement with the servo-screw 315.

The operator controls the operation of the machine by first positioning the lever 66 in accordance with the method of milling to be performed. If plane milling is selected the selector valve mechanism will be positioned by the lever to connect the servo-valves 41 and 51 for control of their respective pistons. The control lever 142 is then moved to select the direction and rate of relative movement between the cutter and work. If the rate of movement is rapid traverse, the operator must hold the lever 142 in its rapid traverse position, otherwise it will automatically return to a feed position. Trip dogs 316 may be applied to the moving slide for automatically tripping the lever 142 from a feed position to a stop position.

Since no means are provided for automatically reversing the direction of movement, the operator must move the lever to obtain a new direction of movement.

When the control lever 142 is in a neutral position, the manual control is automatically rendered available for slide adjustment and is usually utilized when setting up the machine.

For profile milling the lever 66 is thrown to its other position whereby the selector valve mechanism is hydraulically connected for control by the tracer head.

The operator places a work piece and a pattern on the work table the same distance apart as the cutter and tracer and then deflects the tracer manually into contact with the pattern to cause a corresponding direction of movement of the cutter. This direction of movement will be such as to cause undeflection of the tracer and it is necessary for the operator to continually maintain the tracer deflected and in contact with the pattern in order to maintain the cutting action and cause the cutting tool to follow a path corresponding to the outline of the pattern. It will be noted that the tracer is the only element that can cause movement of the tool in this method of milling and that the direction of movement is determined by the direction in which the tracer is deflected.

Interlocking devices are provided for preventing damage to the tracer during downward movement of the vertical slide or a cross movement which would cause abnormal deflection of the tracer and for disconnecting the manual hand wheel to prevent rotation thereof during actuation of either the table or cross slide by power.

There has thus been provided an improved milling machine which may be safely utilized for either one of two methods of milling and which may be easily and quickly converted from a plane milling machine to a profile milling machine.

We claim:

1. In a milling machine having a cutter support and a work support, the combination of a power transmission for effecting relative movement between the supports including a rate determinator having a feed position and a rapid traverse position, a direction determinator having three different positions, a cam shaft having separate cams thereon and operatively connected for controlling each of said determinators, a control lever for rotating said shaft, detent means for holding the lever in any one of the three positions corresponding to the three positions of the direction determinator, said lever being movable against the resistance of said detent means to other positions to cause actuation of said rate determinator, said detent means being effective upon release of the lever to return it to a feed position.

2. In a milling machine having a cutter support and a work support, the combination of transmission means including a final shaft for actuating one of said supports, a manual actuator for said shaft, a clutch for connecting the actuator to the shaft, fluid pressure operable means continuously urging the clutch to an engaged position, a power transmission for said final shaft, control means therefor including a cam shaft having means thereon for causing said power transmission to produce different effects on said final shaft, said cam shaft having a neutral position wherein said power transmission is disconnected from the final shaft, and means operable when said cam shaft is rotated to a power operating position for disengaging said first-named clutch.

3. In a milling machine having a cutter support and a work support, the combination of transmission means including a fluid actuable element connected to the support, a source of fluid pressure, a control valve for connecting said fluid pressure to said element, manual operable means for shifting said valve, a clutch interposed between said manual actuable means and said control valve means, a piston responsive to fluid pressure for normally holding said clutch in an engaged position, and means for disconnecting said clutch upon failure of said fluid pressure.

4. In a milling machine having relatively translatable supports, the combination with hydraulic means for driving one of said supports including a servo-control valve and a first pump for supplying fluid pressure to said valve, of a power transmission for actuating said valve, cam operated means effective on said transmission for determining the rate and direction of movement of said servo-valve, a control shaft for said cam means, a manual actuator for said servo-control valve and normally connected thereto, means operable by said control shaft for disabling said manual control means during power actuation of the servo-control valve, a second pump for supplying additional fluid pressure during rapid traverse actuation of said servo-control valve, and cam operated power means controlled by said shaft for connecting said second pump to the servo-valve for volumetrically increasing the delivery thereto during rapid traverse movement of the support.

5. In a milling machine having a pair of transversely movable slides, one of which is adapted to carry a cutter and the other to support a work piece, the combination of fluid operable pistons moving the respective supports, separate control valve means for each of said pistons, a common pump for supplying fluid to said control valve means, seaprate power actuable means for operating the respective valve means at different rates to produce feeding movements or a rapid traverse movement of the connected supports, a rapid traverse pump and means for combining the delivery of said rapid traverse pump with said feed pump upon rapid traverse actuation of said control valve.

6. In a milling machine having a pair of supports, one of which carries a cutter and the other adapted to support a work piece, the combination with separate fluid operable pistons for moving the respective supports, of control means including a first valve mechanism for determining the admission of fluid pressure to said pistons, a second valve mechanism, a tracer for controlling one of said valve mechanisms, power operable means for controlling the other valve mechanism, and a selector valve for determining which of said valve mechanisms shall control the relative movement between said supports.

7. In a profiling machine having a tool support, a work supporting table, and a tracer mounted on said tool support for engaging a pattern carried by the table, the combination of fluid operable means for feeding the table, a source of pressure therefor, valve means for connecting said source of pressure to the fluid operable means, an actuator for said valve means whereby said table may be power positioned with respect to the tracer, and means responsive to inadvertent deflection of the tracer during said positioning to disconnect the actuator from said valve means.

8. In a profiling machine having a tool support, a work supporting table, and a tracer mounted on said tool support for engaging a pattern carried by the table, the combination of fluid operable means for feeding the table, a source of pressure therefor, valve means for connecting said source of pressure to said fluid operable means including an actuator connectible to said valve means whereby said table may be power positioned with respect to the tracer, means responsive to lateral deflection of the tracer during said adjustment to disconnect the actuator from said valve means, thus stopping movement of the table, and additional means responsive to said lateral deflection of the tracer for automatically repositioning the table until the deflection of said tracer has been removed.

9. In a profiling machine having a tool support, a work support, and a deflectible tracer carried by the tool support, the normal axis of said tracer being perpendicular to the plane of the table, the combination of fluid operable means for effecting relative movement between the tool support and the work support universally in a plane at right angles to the axis of the tracer, a source of fluid pressure, servo-valve means for connecting fluid pressure to said fluid operable means, power actuating means for said servo-valves, and means responsive to lateral deflection of the tracer during power actuation of said valve means for effecting disconnection of said power means from said valve means and thereby cause cessation of the relative movement.

10. In a profiling machine having a tool support, a work support, and a tracer carried by the tool support, the normal axis of said tracer being perpendicular to the plane of the table, the combination of fluid operable means for effecting relative movement between the tool support and the work support universally in a plane at right angles to the axis of the tracer, a source of fluid pressure, servo-valve means for connecting said source of fluid pressure for actuation of said fluid operable means, power actuating means for said servo-valves, means responsive to lateral deflection of the tracer during power actuation of said valve means for effecting disconnection of said power means causing cessation of the relative movement, and automatic means for repositioning the supports until the deflection of the tracer has been removed.

11. In a profiling machine having a tool support and a work support, the combination with a tracer mounted on said tool support, of fluid operable motors for actuating each support, a source of fluid pressure, valve means for connecting said fluid pressure to said motors, a tracer head for supporting said tracer and including valve means having a plurality of motor channels extending therefrom, means connecting the source of fluid pressure to said head whereby upon deflection of the tracer said source of pressure will be connected to said motor channels, and means responsive to pressure in any of said channels for connecting said motor channels exclusively to the motors for control thereof.

12. A milling machine having a work supporting table, a tool spindle, means to support the spindle for two-directional movement with respect to the table, a tracer supported for bodily movement with the spindle, different control means connectible for moving the table and for effecting the two directions of movement of the spindle and tracer, and means responsive to deflection of the tracer during actuation of any one of said controls for automatically disabling said control.

13. In a profiling machine having a pair of slides movable in paths normal to each other, the combination of a cutter spindle and a tracer carried by one of said slides, a hydraulic motor for actuating each slide, a servo-control valve for each motor, additional valve means controlled by the tracer, a selector valve, hydraulic channels connecting the servo-valves and the tracer controlled valves to said selector valve, said selector valve being alternatively positionable to connect either set of channels to the hydraulic motors, fluid operable means for shifting said selector valve to a tracer controlled position, and means responsive to pressure in any of the channels leading from the tracer valve to cause operation of said fluid operable means.

14. In a profiling machine having a pair of relatively movable supports, a cutter spindle and a tracer carried by one of said supports, the combination of separate fluid operable motors for actuating each support, a servo-control valve and a tracer control valve alternatively connectible for governing operation of said motors, a selector valve for effecting said alternative connections, power operable means for actuating said servo-valves including a control shaft having a plurality of active positions and a neutral position, means responsive to deflection of the tracer when the control shaft is in any one of its active positions, causing movement of one of said supports, to automatically cause shifting of the selector valve to its tracer controlled position and simultaneously to position said control shaft in its neutral position.

15. In a profiling machine having a table and a tool slide, the combination of a tracer mechanism carried by one of said slides, fluid operable motors of the piston and cylinder type connected to the table and slide, said cylinders being arranged in planes normal to one another, said tracer mechanism including a tracer head including a plurality of radially arranged valves, there being a separate valve for controlling the flow of fluid to and from one end of the cylinders, said valves lying in planes parallel to the cylinders which they control, a tracer arm pivotally supported in a central relation with respect to said valves and connected thereto, a series of equally spaced compression springs radially arranged intermediate said valves and connected to said tracer arm for normally maintaining the same in a central position whereby all of said valves are closed with respect to said motors, and manually operable means for deflecting said tracer arm to cause relative movement between the tracer arm and the table in a plane parallel to the plane of tracer deflection.

16. In a profiling machine having a pair of relatively movable slides for effecting universal movement in a plane between a tracer carried by one of said slides and a pattern carried by the other, the combination of fluid operable motors for moving each slide, servo-valve mechanisms for each motor, a selector valve positionable for connecting said servo-valves to the respective motors, tracer controlled valves having channels leading to said selector valve, means normally centralizing said tracer and holding said tracer controlled valves in a closed position, fluid operable means for shifting said selector valve to connect said channels to said motors, a pilot valve mechanism connectible to said channels by the selector valve mechanism including a plurality of resiliently centralized plungers, and means responsive to pressure in any of said channels for shifting one of said plungers to connect a source of pressure to said fluid operable means and cause shifting of said selector valve to a tracer controlled position, whereby said channels are connected for the control of said motors.

ERWIN G. ROEHM.
HANS FRITSCHI.